UNITED STATES PATENT OFFICE.

JACOB F. SAIGER, OF SHELBY, OHIO.

IMPROVEMENT IN CURING AND PRESERVING BUTTER.

Specification forming part of Letters Patent No. 98,421, dated December 28, 1869.

*To all whom it may concern:*

Be it known that I, JACOB F. SAIGER, of Shelby, in the county of Richland and State of Ohio, have invented a new and valuable Improvement in Modes of Curing and Preserving Butter; and I do hereby declare that the following is a full, clear, and exact description of the same.

My invention relates to means for curing and preserving butter; and it consists in a novel arrangement and process whereby it is intended to cure and preserve butter from taint for a long period of time.

My arrangement and process are as follows, to wit: I take fresh butter and mix with it thoroughly a small quantity of saltpeter and pure white sugar—say about three or four ounces of each to every hundred pounds of butter. I next place the butter thus mixed in firkins, tubs, crocks, or other suitable vessels and close such vessels air-tight. I then place the vessels in a barrel, box, or other suitable packing-case and cover them, respectively, to the depth of two inches, more or less, with common salt. I also inclose the outer case in salt to about the same depth and let the butter remain so packed until I am ready to use it. I place one or more of these butter-packages in each outer case, as circumstances may dictate or require.

I claim—

The arrangement or process herein described for curing and preserving butter, substantially as specified.

In testimony that I claim the above I have hereunto subscribed my name in the presence of two witnesses.

JACOB F. SAIGER.

Witnesses:
S. S. BLOOM,
D. CUMMINS.